Little & Gibbs.
Harvester Rake.

Nº 72208. Patented Dec. 17, 1867.

Witnesses
A. Moore
H. S. Miller

Inventors
Rufus Little & Lewis Gibbs
By their attorney A. B. Stoughton

United States Patent Office.

RUFUS LITTLE AND LEWIS GIBBS, OF CANTON, OHIO, ASSIGNORS TO THEMSELVES AND JOHN R. BUCHER, ALL OF SAME PLACE.

Letters Patent No. 72,208, dated December 17, 1867.

---

IMPROVEMENT IN HARVESTER-RAKES.

---

The Schedule referred to in these Letters Patent and making part of the same.

---

TO ALL WHOM IT MAY CONCERN:

Be it known that we, RUFUS LITTLE and LEWIS GIBBS, of Canton, in the county of Stark, and State of Ohio, have invented certain new and useful Improvements in Droppers and Rakes for Harvesting-Machines; and we do hereby declare the following to be a full, clear, and exact description of the same, reference being had to the accompanying drawings, making a part of this specification, in which—

Figure 1:
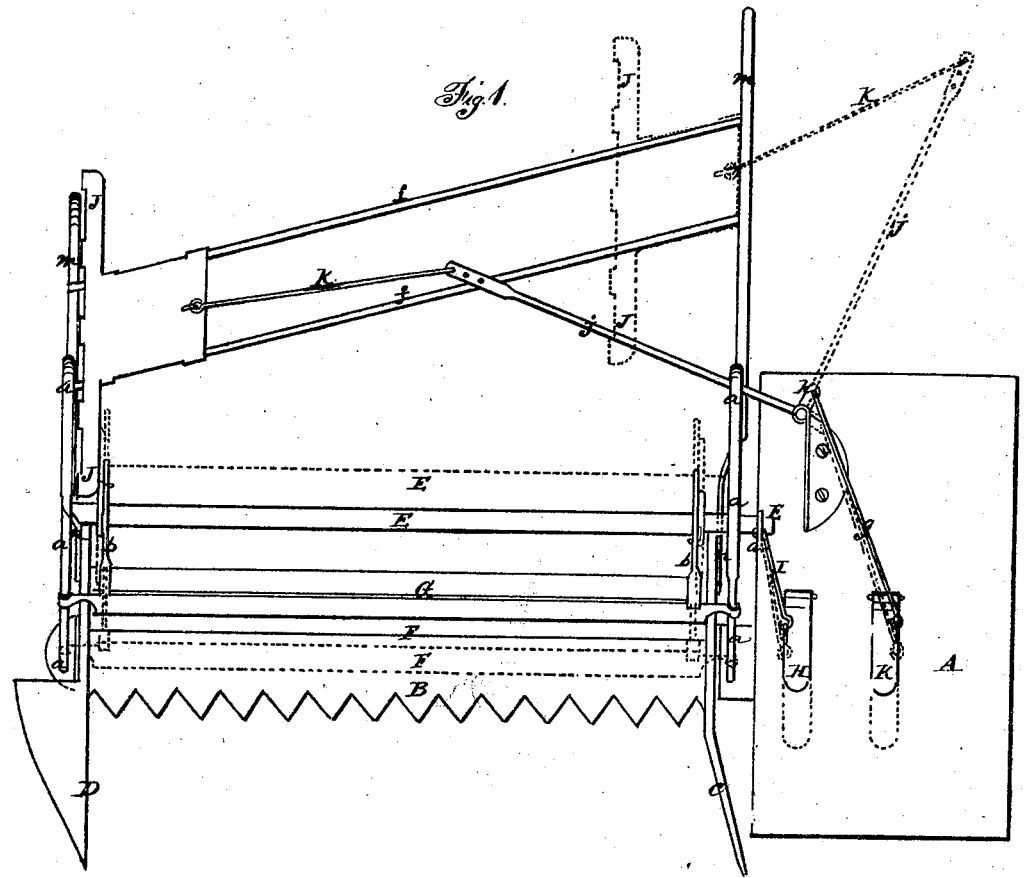
Figure 2:
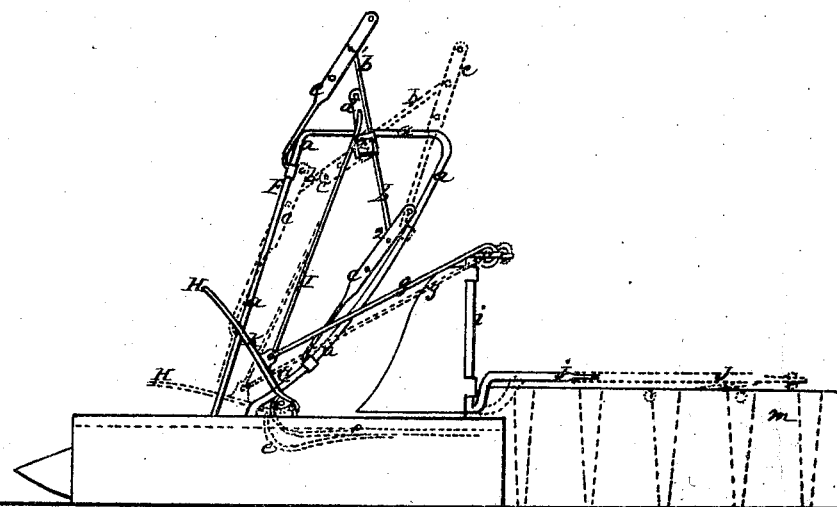

Figure 1 represents a top plan of so much of a harvesting-machine as will illustrate our invention; and Figure 2 represents an end elevation of the same.

Similar letters of reference, where they occur in the separate figures, denote like parts in both of the drawings.

Our invention consists, first, in a pair of plates, hung to a rocking-shaft that is operated from the main frame either by the driver or conductor riding on the machine, or automatically, as may be preferred, said plates being so hung and operated as that when one is down the other is up, and *vice versa*, and so that the front one shall hold the falling grain, whilst the rear one is delivering the gathered gavel on to the ground.

And our invention further consists in a rake, combined with and carried upon a hinged frame, for raking the grain, delivered on to the ground in a swath, into a gavel on one side of the path of the machine, so as to be readily bound up and be out of the way of the machine on the next round or swath.

To enable others skilled in the art to make and use our invention, we will proceed to describe the same with reference to the drawings.

A represents a portion of the main frame of a harvesting-machine; B, the cutting-apparatus; C, the inside, and D the outside shoes or dividers. At or near each shoe, or each end of the cutter-bar, there are arranged two upright supporters, $a\ a$, upon which is hung in suitable bearings, so as to rock therein, a shaft, E, extending from one supporter to the other. Transversely to this shaft, E, and at or near each end of it, are fastened arms or levers, $b$, extending forward and rearward of said rock-shaft. Upon the front and rear portions of the supporters, $a$, are hung, by dead-eyes or loops, two metal plates, F and G, which plates are connected respectively to the ends 1 2 of the levers or arms $b$ by links $c$, so that by the rocking of the shaft E one plate ascends whilst its mate or fellow descends, and *vice versa*. The front plate, F, rises and falls in a slightly inclined but straight plane, whilst the rear plate, G, moves in a curved line corresponding to the curvature of the rear portion of the supporter $a$. On the platform, A, there is a foot-lever, H, which is raised up by a spring, $e$, recoiling or reacting against it from below. To this foot-lever is attached one end of a rod, I, the other end thereof being attached to an arm, $d$, upon the rock-shaft E, so that by pressing upon the foot-lever H, the front blade, F, goes down and the rear one, G, up; and by releasing the lever H, the spring $e$ causes a reversed action of the blades, the front one going up and the rear one going down. And though we have shown this operation as derived from the foot of the operator upon, and the release of, the lever H, yet the same may be derived from the moving parts of the machine automatically, the driver or conductor only setting the mechanism, so that it will operate when enough has been gathered to form a gavel.

The operation of the plates is as follows: The front plate being up and the rear one down, the machine advances until enough is caught and held upon the rear plate, G, to make, when drawn together, a proper-sized gavel. The operator then presses down the lever H, which brings down the front plate, F, and raises up the rear one, G, which allows the gathered grain to fall in a swath or windrow upon the ground. Whilst the gathered grain is thus being dropped on to the ground, the front plate is catching and holding that which is falling, to prevent it from being tangled with that which is being delivered. On releasing the lever H, the blades return to their former position, the front one, in rising, delivering to the rear one the grain which it had caught and held whilst the rear one was delivering its charge. This vibrating of the plates, as above stated, may be done by other means, directly from the moving gear, than by the lever H or the driver, and by means well known to any mechanician.

The grain thus dropped upon the ground lies in the form of a swath, spread out, and would be in the way of the machine on its next round if so left. To move it out of the path of the machine, and to gather it in a compact form to be bound up in a gavel, we arrange a rake, J, which moves in an oblique direction across the rear of the machine, resting upon guides $ff$, (the obliquity of the movement not being controlling, as it may move square across.) The teeth, shown in red in fig. 2, of this rake project downward far enough to take the grain upon the ground, and rake it into a gavel at one side of the path of the machine, and out of the way for its next round. The rake may be operated by a treadle, K, on the main frame, alongside of the one, H, above mentioned, and controlled like it by a spring underneath it. To this treadle or foot-lever K there is connected a rod, $g$, the other end of which is attached to an arm, $h$, on a vertical shaft, $i$, so that the working of the foot-lever will turn said shaft $i$. To the lower end of the shaft $i$ there is attached a long arm, $j$, which projects outward, and is connected with the rake-head by a link or rod, $k$, and by this connection between the rake J and the treadle or foot-lever K, the rake is traversed upon its guides $ff$. The runners or frame $m$, upon which the rake and guides are placed, are connected to the shoes or dividers C D, or other part of the machine, by hinged rods, bars, or arms $n$, so that the rake can conform to the undulations of the ground and independent of the movement of the cutters, as they pass over the ground in advance of the rake. The rake may be operated by other mechanism, so as to perform the same duty, and may be put into motion by the driver, and thrown out automatically, all of which is understood by harvester-builders, and need not be fully described.

The black and red lines show the two positions of the several moving parts of the machine.

Having thus fully described our invention, what we claim, and desire to secure by Letters Patent, is—

1. The dropper, composed of two blades that are moved in contrary directions by the rocking of a shaft, and which alternately hold and deliver the grain that has fallen against them, substantially in the manner described.

2. We also claim the rake, in combination with the hinged runners or frame, and which moves back and forth on said hinged runners or frame, conforming to the undulations of the ground to rake the grain upon the ground out of the way and into a gavel for binding, substantially as described.

RUFUS LITTLE,
LEWIS GIBBS.

Witnesses:
W. W. CLARK,
A. B. STOUGHTON.